United States Patent
Shikayama et al.

(10) Patent No.: US 6,800,968 B1
(45) Date of Patent: Oct. 5, 2004

(54) LINEAR MOTOR

(75) Inventors: Toru Shikayama, Fukuoka (JP); Nobuyuki Irie, Fukuoka (JP); Yasuhiro Miyamoto, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/311,226
(22) PCT Filed: Jun. 19, 2000
(86) PCT No.: PCT/JP00/04001
§ 371 (c)(1), (2), (4) Date: Jul. 29, 2003
(87) PCT Pub. No.: WO01/99261
PCT Pub. Date: Dec. 27, 2001

(51) Int. Cl.$^7$ ............................................. H02K 41/00
(52) U.S. Cl. ...................................................... 310/12
(58) Field of Search .............................. 310/12, 13, 14

(56) References Cited

U.S. PATENT DOCUMENTS

| 3,942,050 A | * 3/1976 | Oberretl | 310/13 |
| 5,075,583 A | 12/1991 | Sakagami et al. | |

FOREIGN PATENT DOCUMENTS

| JP | 58-63074 | 4/1983 |
| JP | 61-46893 | 3/1986 |
| JP | 62-195375 | 12/1987 |
| JP | 2-290152 | 11/1990 |
| JP | 4-183264 | 6/1992 |

* cited by examiner

*Primary Examiner*—Thanh Lam
*Assistant Examiner*—Judson H. Jones
(74) *Attorney, Agent, or Firm*—Sughrue Mion, PLLC

(57) ABSTRACT

A linear motor excellent in insulation between armature coils, easy to assemble, very small in thrust ripple, comprising a secondary side supporter attached with a secondary side consisting of a plurality of magnetic field poles, and an armature element supporter facing the secondary side via a clearance and provided with an armature element (4) having a plurality of concentrate-wound armature coils (6), the secondary side and the armature element (4) being disposed facing each other and in parallel in the advancing direction, wherein field poles in the secondary side are disposed in the advancing direction of a mover with adjacent poles being unlike every Pm pitches, and a plurality of armature coils (6) are disposed in an array in the advancing direction of the mover every Pc pitches, the coil pitch Pc=5/3×Pm.

1 Claim, 6 Drawing Sheets

LINEAR MOTOR

FIELD OF THE INVENTION

The present invention relates to a linear motor for a fixed feedrate and high-speed position, for which small thrust ripple, small yawing of a mover, and small pitching are required.

BACKGROUND ARTS

In conventional types of linear motors, there is a type in which concentrate-wound armature coils are disposed without being overlapped. Since no cogging force is generated, such a type is suitable for use in which a small speed ripple is required. Also, the insulation thereof is easy because it is of a simple structure in which concentrate-wound armature coils are disposed without being overlapped, and it is possible to apply the type for use in which the voltage is 200V.

FIG. 6 through FIG. 8 show a linear motor according to the prior art. FIG. 6 is a front elevational sectional view in which the linear motor is observed from the advancing direction of a mover thereof, FIG. 7 is a plan sectional view taken along the line A—A in FIG. 6, and FIG. 8 is a side elevational view showing an armature element.

In FIG. 6 through FIG. 8, a linear motor 1 is composed of a mover 2 and a stationary part 3. The mover 2 consists of a so-called coreless type armature element 4 and an armature element supporter 5 having the above-described armature element 4 attached thereto. The above-described armature elements 4 are provided in a plurality, for example, six concentrate-wound armature coils 6 are disposed in a row in the advancing direction, and are molded with resin.

Also, the above-described armature coils 6 have a 3-phase, 3-coil and 4-pole basic structure, and the coil pitch Pc of the armature coils 6 is 4/3×Pm. The six armature coils 6 are disposed in order of U, W and V from the left side on the paper (page).

The profile of the above-described concentrate-wound armature coils 6 is, as shown in FIG. 8, shaped so that two coil sides facing secondary sides 8a and 8b and mainly generating thrust are made parallel to each other. And, these six armature coils 6 are disposed in a row in the advancing direction.

Further, the stationary part 3 has secondary sides 8a and 8b composed of permanent magnets and acting as so-called magnetic field poles and secondary side supporters 9a and 9b acting as so-called back yokes, to which the above-described secondary sides 8a and 8b are attached. The permanent magnets that constitute the above-described secondary sides 8a and 8b are disposed with a pitch Pm shifted from a permanent magnet adjacent to each other so that these have a different polarity, and are disposed so that permanent magnets facing each other have a different polarity. In addition, the above-described secondary sides 8a and 8b and the above-described armature elements 4 are disposed in parallel to each other in the advancing direction facing each other, and two secondary side supporters 9a and 9b are linked with each other and supported by a supporting member 10.

However, the prior art has the following problems.
(1) Since armature coils of different phases are adjacent to each other, there is a concern that defective insulation may arise where the armature coils are used with high voltage such as 200V.
(2) In order to increase insulation properties, it is necessary to place an insulating substance between the armature coils, wherein assembly becomes cumbersome and production cost thereof is increased.
(3) Since concentrate-wound armature coils are used, thrust ripple may occur.

DISCLOSURE OF THE INVENTION

The present invention was developed to solve such problems, and it is therefore an object of the invention to provide a linear motor, which can be easily assembled, having satisfactory insulation between armature coils and very small thrust ripple.

In order to solve the above-described problems, the invention is such that a linear motor, which is excellent in insulation between armature coils, easy to assemble and very small in thrust ripple, comprises a secondary side supporter attached with a second side consisting of a plurality of magnetic field poles, and an armature element supporter facing the secondary side via clearance and provided with an armature element having a plurality of concentrate-wound armature coils, wherein the secondary side and the armature element are disposed facing each other and in parallel in the advancing direction, wherein field poles in the secondary side are disposed in the advancing direction of a mover with adjacent poles differing for each Pm pitch, and a plurality of armature coils are disposed in an array in the advancing direction of the mover for each of the respective Pc pitches. Further, the above-described coil pitch Pc is made into Pc=5/3×Pm, and the above armature coil is formed of two layers at both left and right sides, and the armature coil between the two layers is disposed with a shift of n/6×Pm (n is an integral number excepting 3).

As described above, the invention brings about the following effects.
(1) Since the concentrate-wound armature coils are disposed apart from each other with a prescribed clearance, satisfactory insulation can be brought about even with high voltage specifications of 200V.
(2) Since it is not necessary to place any insulating substance between the armature coils and assembly is easy, the production cost thereof can be decreased.
(3) Since armature coils are disposed to shift to both left and right sides of the armature element, the phase belt can be distributed, it is possible to decrease the thrust ripple resulting from unevenness in magnetization of magnetic field poles such as a permanent magnet and positional shift thereof.

PREFERRED EMBODIMENTS OF THE INVENTION

Hereinafter, a description is given of embodiments of the invention on the basis of the accompanying drawings.

Figure 6:
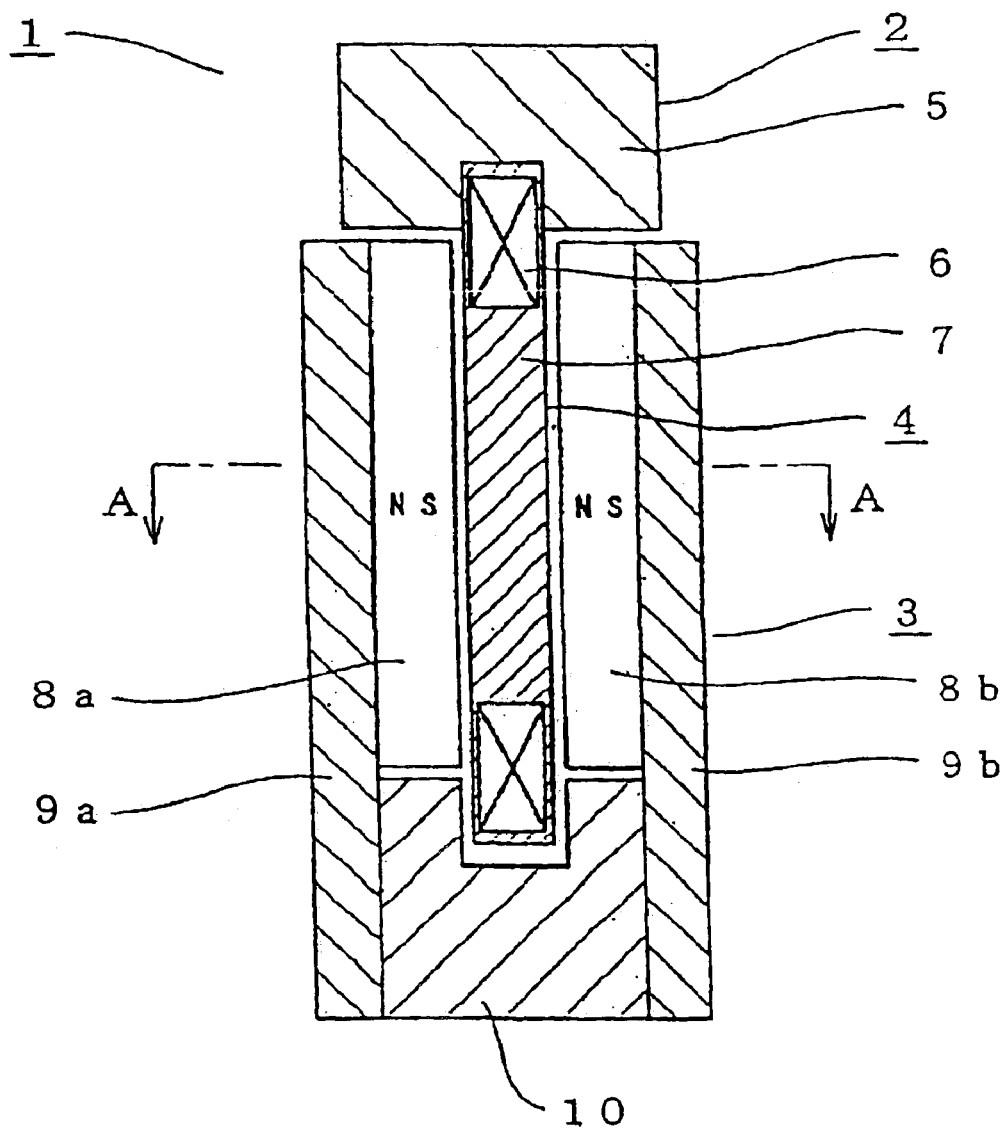
FIG. 6 is a front sectional view showing a linear motor according to a prior art.
Figure 7:
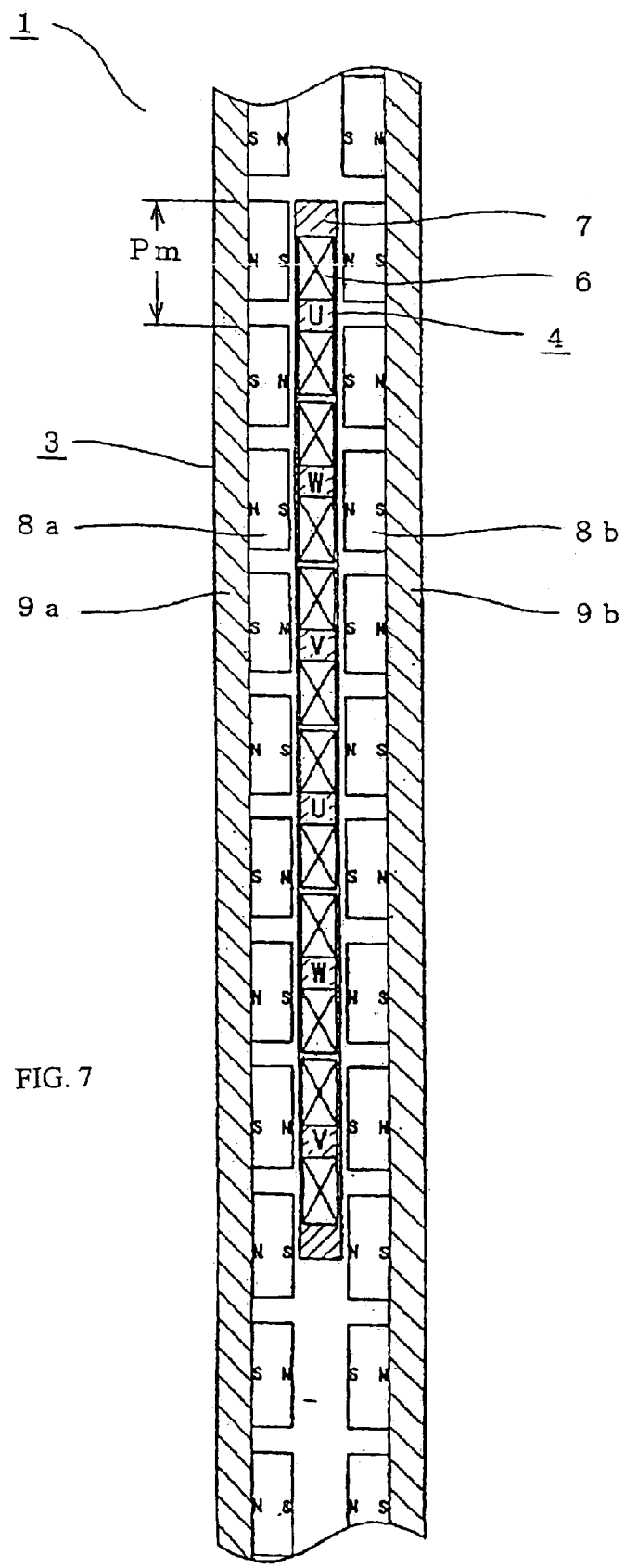
FIG. 7 is a plan sectional view taken along the line A—A in FIG. 5.
Figure 8:
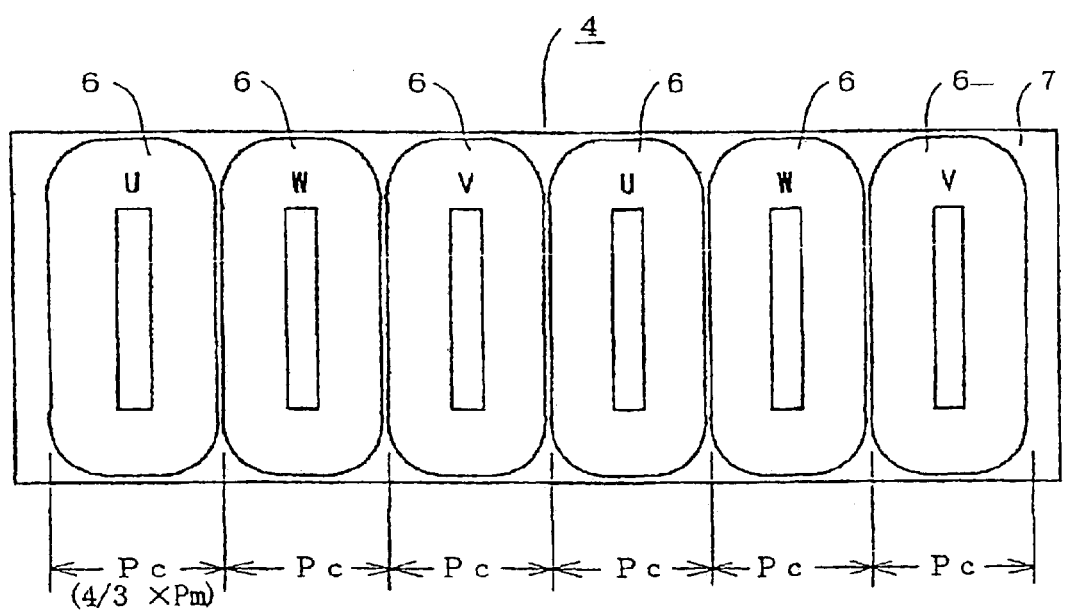
FIG. 8 is a view of a coil array according to the prior art.

Also, the basic structure of a linear motor according to the invention is roughly the same as a linear motor according to the prior art, excepting its armature element, wherein parts of the linear motor according to the invention, which are the same as those in FIG. 6 through FIG. 8 or correspond to those therein, are given the same reference numbers, and description thereof is omitted.

[Embodiment 1]

Figure 1:
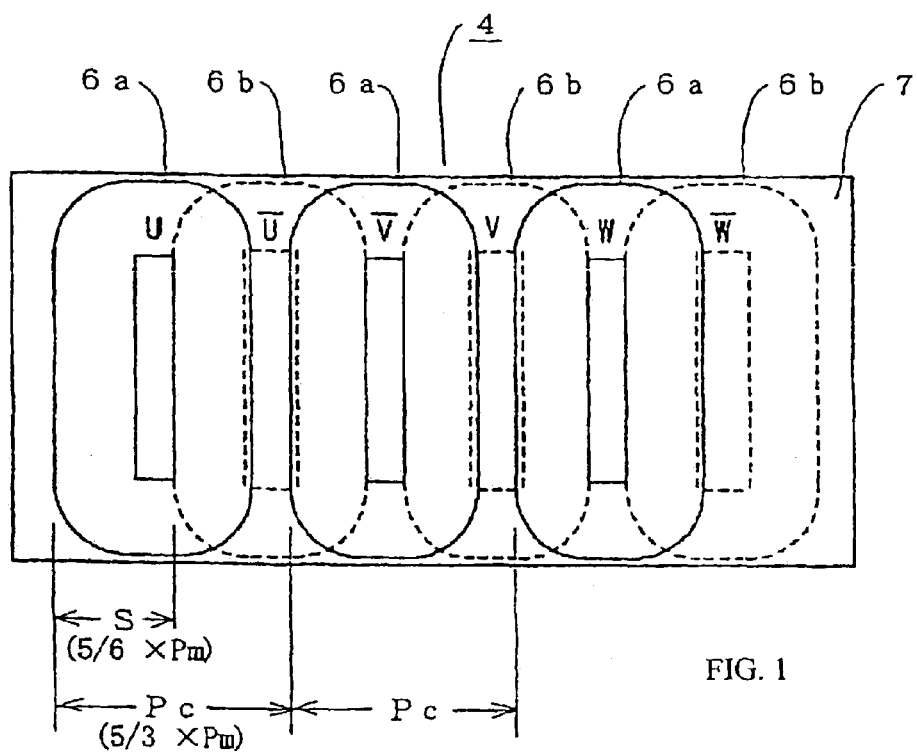
FIG. 1 is a coil layout view showing a first embodiment of the invention.

FIG. 1 is a side elevational view of an armature element showing an array of armature element coils according to Embodiment 1 of the invention.

As shown in FIG. 1, the armature element 4 is composed so that coil layers in which concentrate-wound armature coils 6 are disposed in a row in the advancing direction are made into two layers, an insulating substance of a non-magnetic material is inserted between the coil layers, and the entirety is molded with resin 7. The first coil layer 6a at the left side of the paper (page) and the second coil layer 6b at the right side thereof are arranged pitch by pitch and disposed in the advancing direction of a mover where the coil pitch Pc of the concentrate-wound armature coils 6 is made into Pc=5/3×Pm when the pitches of the respective magnetic field poles is made into Pm.

Further, the first coil layer and the second coil layer are disposed to shift with a shift amount S of 5/6×Pm in the advancing direction of the mover. If this is expressed in terms of electrical angle, it becomes 5/6×180=150 degrees. Therefore, in the first coil layer 6a of the armature element 4, a U-phased coil wound in the forward direction, a V-phased coil wound in the reverse direction and a W-phased coil wound in the forward direction are arranged in order from the left side of the paper (page), and in the second coil layer 6b, a U-phased coil wound in the reverse direction, a V-phased coil wound in the forward direction, and a W-phased coil wound in the reverse direction are arranged in order from the left side thereof.

Figure 2:
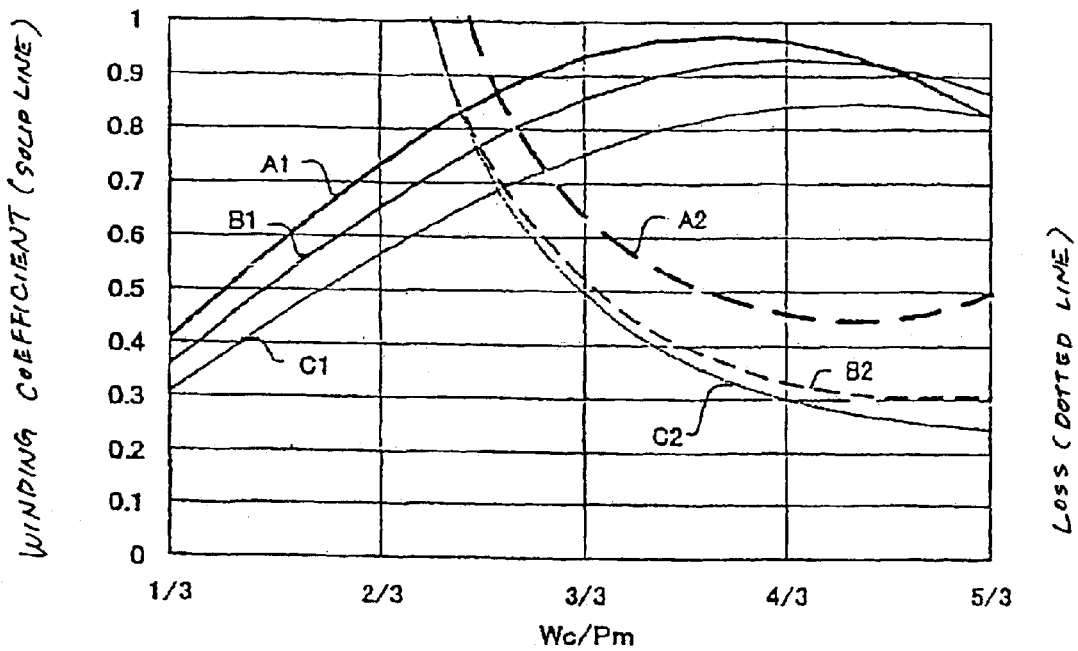
FIG. 2 is a graph showing the relationship between a winding coefficient and a loss for coil width Wc/magnet pitch Pm in one armature coil.
Figure 3:
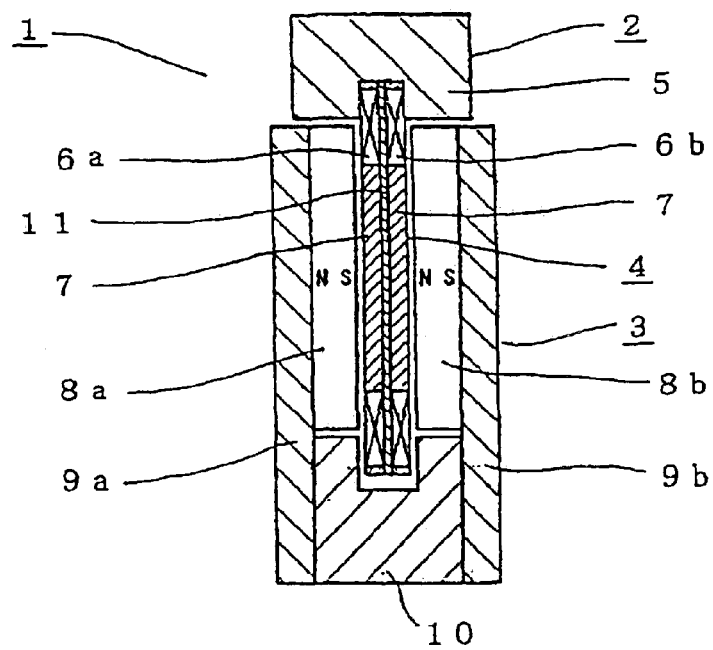
FIG. 3 is a front sectional view of a linear motor according to a second embodiment of the invention.

With respect to one armature coil 6, the relationship between the number of windings for coil width Wc/magnetic pitch Pm and a loss when a prescribed thrust is generated is shown in FIG. 2.

In FIG. 2, reference numbers A1 and A2 show cases where an armature coil in which the ratio of clearance width (width of clearance at the central portion of a coil) with respect to the coil width Wc is 0.6 is used, B1 and B2 show cases where an armature coil in which the ratio of clearance width (width of clearance at the central portion of a coil) with respect to the coil width Wc is 0.4 is used, and C1 and C2 show cases where an armature coil in which the ratio of clearance width (width of clearance at the central portion of a coil) with respect to the coil width Wc is 0.2 is used. In the invention, since the coil pitch Pc is made into 5/3×Pm, it is necessary to consider that Wc/Pm is 5/3 or less. The winding coefficient is maximized in the vicinity of Wc/Pm being 4/3. Since the number of windings can be increased by widening the coil width Wc, the loss can be minimized where Wc/Pm is larger than 4/3. However, as Wc/Pm approaches 5/3, the clearance between the coils is made narrow, wherein insulation between the armature coils 6 constitutes a problem. With the invention, it is possible to determine the coil width Wc by the size of the pitch Pm of the magnetic field poles and necessary spacing for insulation. For example, where the pitch Pm of the magnetic field poles is 18 mm and Wc/Pm by which the loss can be decreased is 4/3;

Coil pitch Pc=5/3×18 mm=30 mm
Coil width Wc=4/3×18 mm=24 mm
Coil spacing Wg=Pc−Wc=30 mm−24 mm=6 mm That is, the spacing between the armature coils 6 will be opened by 6 mm.

In the case of the prior art, since the coil spacing is remarkably narrowed, there is a problem in that no insulation can be secured in high-voltage specifications. In the case of the invention, since clearance of 6 mm can be secured between the armature coils 6, insulation can be secured without fail even if no insulating substance is inserted therein.

The armature element 4 is formed by molding the concentrate-wound armature coils 6, which are disposed in a row in the advancing direction, with resin 7. The above-described armature coils 6 are formed of six coils of three phases and are disposed pitch by pitch in the advancing direction of a mover where the coil pitch Pc of the concentrate-wound armature coils 6 is made into Pc=5/3× Pm when the pitch of the magnetic field poles of the secondary side is made into Pm.

These six armature coils 6 are arranged so that, from the left side of the paper (page), a U-phase coil wound in the forward direction, a V-phased coil wound in the reverse direction, and a W-shaped coil wound in the forward direction, a U-phased coil wound in the reverse direction, a V-phased coil wound in the forward direction, and a W-phased coil wound in the reverse direction are disposed.

In addition, if the above-described coil pitch Pc is expressed in terms of electrical angle, it becomes 5/3×180= 300 degrees.

In addition, if the armature element 4 is observed from the side (that is, observed from the second side), there can be seen some parts where coils of different phases overlaps each other. That is, in the armature element 4, since a phase belt is distributed in the thickness direction of an air gap between the armature element 4 and the secondary side 8a or 8b, it is possible to reduce the thrust ripple that is produced by unevenness in magnetization of magnetic field poles such as a permanent magnet and positional shift thereof.

[Embodiment 2]

Figure 4:
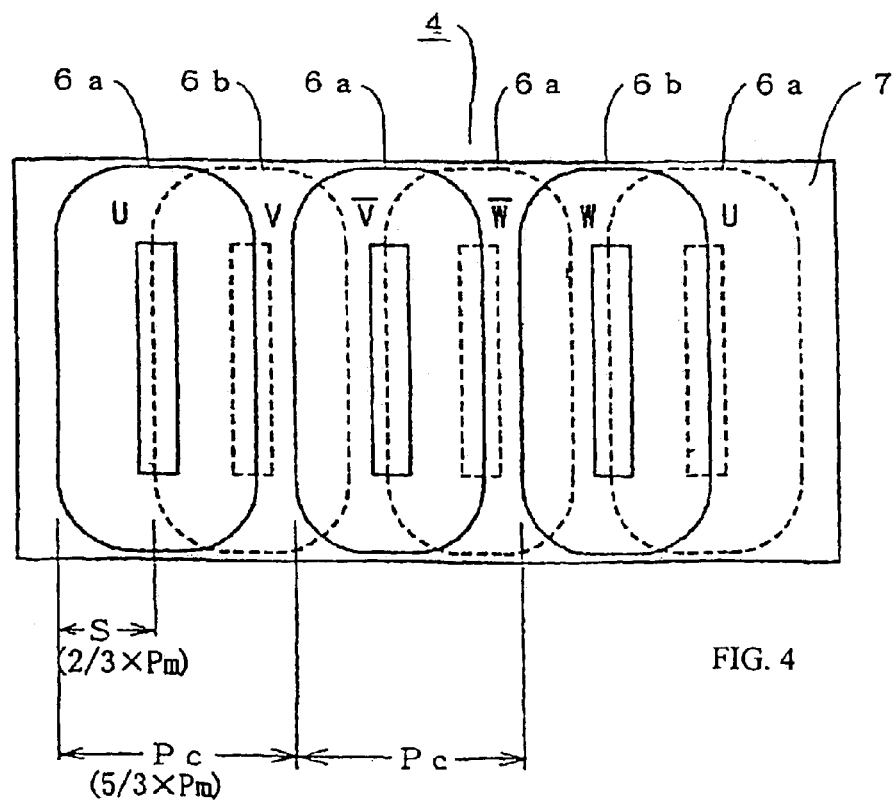
FIG. 4 is a view showing a coil array according to a second embodiment of the invention.

Next, a description is given of Embodiment 2 on the basis of FIG. 4.

Embodiment 2 is a variation of Embodiment 1 in which the arraying method of armature coils 6 of the armature element 4 is changed. Although the array of the respective coils in the first coil layer and the second coil layer are the same as that of Embodiment 1, the first coil layer and the second coil layer are disposed with a shift of 2/3×Pm (electrical angle of 120 degrees). In the first coil layer, a U-phased coil wound in the forward direction, a V-phased coil wound in the reverse direction, and a W-phased coil wound in the forward direction are arrayed in order from the left side of the paper (page), and in the second coil layer, a V-phased coil wound in the forward direction, a W-phased coil wound in the reverse direction, and a U-phased coil wound in the reverse direction are arranged in order from the left side thereof.

In Embodiment 2, effects similar to those of Embodiment 1 can be brought about. Since, in Embodiment 2, a shift of the first coil layer 6a and the second coil layer 6b is made small to 120 degrees in terms of electrical angle, there is an advantage in that the length of the armature element 4 can be made small.

[Embodiment 3]

Figure 5:
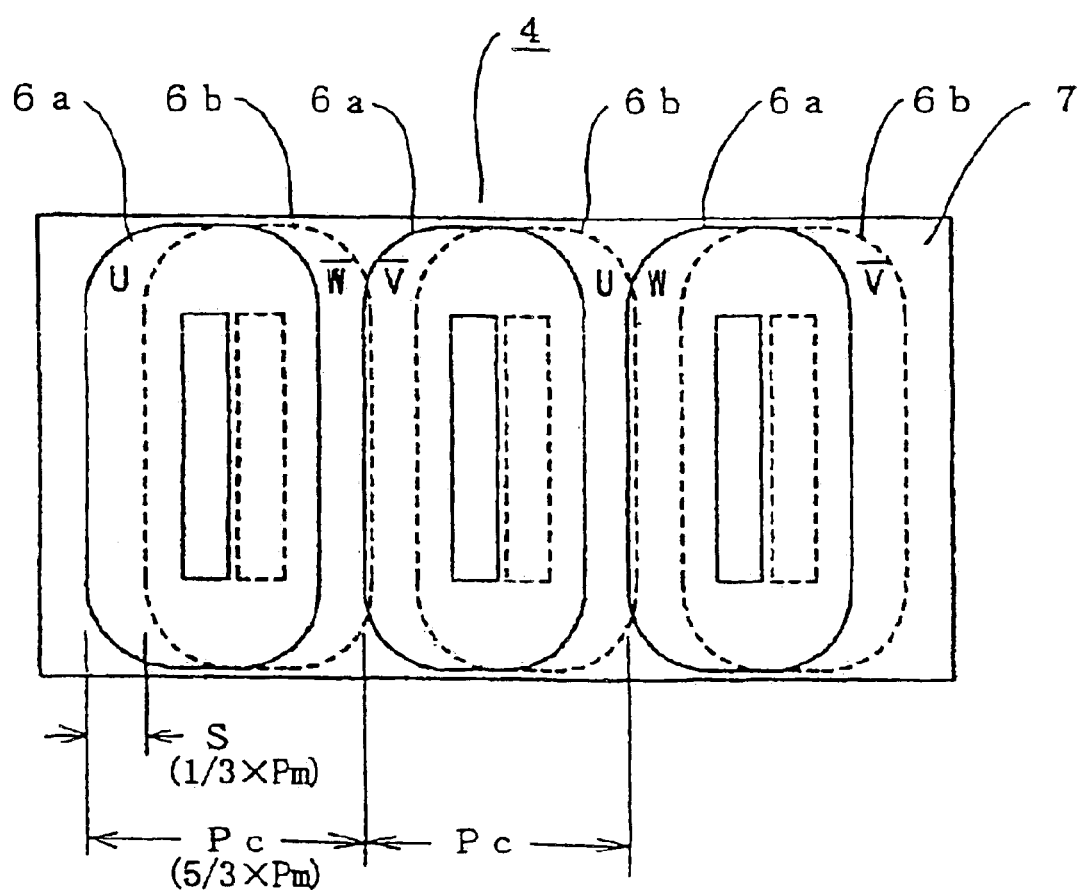
FIG. 5 is a view showing a coil array according to a fourth embodiment of the invention.

Next, a description is given of Embodiment 3 on the basis of FIG. 5.

Embodiment 3 is a variation of Embodiment 1 or 2, in which the coil arraying method of the armature element 4 is changed. The coil array of the first coil layer 6a is identical to that of the second coil layer 6b. However, the first coil layer 6a and the second coil layer 6b are disposed with a shift of 1/3×Pm (electrical angle of 60 degrees). In the first coil layer 6a, a U-phased coil wound in the forward direction, a V-phased coil wound in the reverse direction, and a W-phased coil wound in the forward direction are arrayed in order from the left side of the paper (page), and in the second coil layer 6b, a W-phased coil wound in the reverse direction, a U-phased coil wound in the reverse direction and a V-phased coil wound in the forward direction are arranged in order from the left side thereof.

With Embodiment 3, effects similar to those of Embodiment 1 or 2 can be brought about. However, since, in Embodiment 3, the shift of the first coil layer 6a and the second coil layer 6b is made small to 60 degrees in terms of electrical angle, there is a further advantage in that the length of the armature element 4 can be made small.

In addition, the present invention is not limited to each of the above-described embodiments, wherein it may be composed as shown below.

(a) Any one of the armature elements and the secondary sides may be a stator or a mover.

(b) The linear motor according to the invention may not only be a permanent magnet type linear motor, but also an electromagnetic type linear motor, also, it may be any type of linear motor having an armature such as an induction type linear motor, and a reluctance type linear motor.

(c) The armature element may not be a coreless type but may be a core type.

INDUSTRIAL APPLICABILITY

The present invention is applicable to a field of producing and providing a linear motor for a fixed feedrate and high-speed position, for which small thrust ripple, small yawing of a mover, and small pitching are required.

What is claimed is:

1. A linear motor comprising:

a secondary side supporter attached with a secondary side consisting of a plurality of magnetic field poles; and an armature element supporter facing the secondary side via clearance and provided with an armature element having a plurality of concentrate-wound armature coils; in which said secondary side and said armature element are disposed facing each other and in parallel in the advancing direction;

wherein field poles in said secondary side are disposed in the advancing direction of a mover with adjacent poles differing by a pitch to Pm, and a plurality of armature coils are disposed in an array in the advancing direction of the mover for each of a respective coil pitch equal to Pc the coil pitch being made into Pc=5/3×Pm, and armature coils of said armature element is formed of two layers in which a first coil layer and a second coil layer are laminated in the direction of an air gap, wherein said first coil layer and second coil layer are disposed with a shift of n/6×Pm where n is an integral number excepting a multiple of 3.

\* \* \* \* \*